(12) United States Patent
Kim et al.

(10) Patent No.: US 6,987,145 B2
(45) Date of Patent: Jan. 17, 2006

(54) HETERO-BRANCHED RADIAL POLYSTYRENE-POLYISOPRENE BLOCK COPOLYMER COMPOSITION AND PREPARATION METHOD THEREOF

(75) Inventors: Sam-Min Kim, Daejeon (KR); Dai-Seung Choi, Daejeon (KR); Jong-Geun Kim, Daejeon (KR); Hak-Kyung Kim, Daejeon (KR); Tae-Yi Kang, Daejeon (KR)

(73) Assignee: Korea Kumho Petrochemical Co., Ltd., (KR)

( * ) Notice: Subject to any disclaimer, the term of this patent is extended or adjusted under 35 U.S.C. 154(b) by 0 days.

(21) Appl. No.: 10/736,423

(22) Filed: Dec. 15, 2003

(65) Prior Publication Data

US 2005/0131159 A1 Jun. 16, 2005

(51) Int. Cl.
*C08L 53/02* (2006.01)
(52) U.S. Cl. .................... 525/89; 525/98; 525/332.9; 525/333.1; 525/316
(58) Field of Classification Search ............... 525/89, 525/98, 332.9, 333.1, 316
See application file for complete search history.

(56) References Cited

U.S. PATENT DOCUMENTS 3,840,616 A 10/1974 Clark et al.
5,292,819 A 3/1994 Diehl et al.
5,399,627 A 3/1995 Diehl et al.
5,532,319 A 7/1996 Asahara et al.
5,552,493 A 9/1996 Spence et al.
5,583,182 A 12/1996 Asahara et al.
5,668,208 A 9/1997 Viola et al.
6,534,593 B1 3/2003 Komatsuzaki et al.

FOREIGN PATENT DOCUMENTS

WO WO 92/20725 11/1992
WO WO 95/14727 6/1995

OTHER PUBLICATIONS

Fetters et al., "A Resolution of the State of Association of Poly(dienyl)lithium Chain Ends in Hydrocarbon Solvents", Macromolecules, vol. 7, No. 5, Sep.-Oct. 1974, pp. 552-559.
Hadjichristidis et al., "Star-Branched Polymers.1.The Synthesis of Star Polyisoprenes Using Octa- and Dodecachlorosilanes as Linking Agents", Macromolecules, vol. 11, No. 4, Jul.-Aug. 1978, pp. 668-672.

*Primary Examiner*—James J. Seidleck
*Assistant Examiner*—Olga Asinovsky
(74) *Attorney, Agent, or Firm*—Dilworth & Barrese LLP

(57) ABSTRACT

Disclosed is a hetero-branched radial block copolymer suitable as a base polymer of pressure-sensitive adhesives, the hetero-branched radial block having a hetero-branched structure comprised of polystyrene, polyisoprene, and polybutadiene blocks and being represented by $$(pS\text{-}pI)_3X\text{-}(pB\text{-}pI\text{-}pS)$$

wherein pS is polystyrene; pI is polyisoprene; pB is polybutadiene; and X is a residue of a tetravalent coupling agent.

17 Claims, No Drawings

HETERO-BRANCHED RADIAL POLYSTYRENE-POLYISOPRENE BLOCK COPOLYMER COMPOSITION AND PREPARATION METHOD THEREOF

BACKGROUND OF THE INVENTION

1. The Field of the Invention

The present invention relates to a hetero-branched radial polystyrene-polyisoprene (SIS) block copolymer used as a base polymer of pressure-sensitive adhesive compositions, and a preparation method thereof.

2. Related Prior Art

Different block polymers comprised of polystyrene-polyisoprene blocks have been used as a base polymer of pressure-sensitive adhesive compositions. Moreover, radial polystyrene-polyisoprene block polymers are known to be excellent in initial adhesion, holding power, workability, and heat stability.

Various coupling agents are available in use for the preparation of the radial polystyrene-polyisoprene block copolymers. Among the tetravalent coupling agents, $SiCl_4$ is most preferred in the aspect of reactivity, bond stability, price, and supply stability.

Techniques for the preparation of a radial polystyrene-polyisoprene block copolymer using $SiCl_4$ as a coupling agent are disclosed in, for example, U.S. Pat. Nos. 5,668,208; 5,552,493; and 6,534,593 B1.

As stated in the documents, an active lithium polymer having an isoprene terminal participates in a coupling reaction with $SiCl_4$ to form a polymer having three branches due to steric hindrance. The use of butadiene to solve the problem that the steric hindrance prohibits 4-branch coupling is disclosed in U.S. Pat. No. 3,840,616. The use of butadiene for 4-branch coupling in the case of polymers having an isoprene or styrene terminal is described in a Fetters and Hadjichristidis et al., (*Macromolecules*, 7, 552, 1972 & 11, 668, 1978). The technologies applied to radial polystyrene-polyisoprene block copolymers based on the results of the researches are U.S. Pat. Nos. 5,292,819; and 5,399,627, WO 9220725 and WO 9514727.

More specifically, these techniques include adding less than 10% butadiene to the terminal of the isoprene block, and inducing a coupling with $SiCl_4$ to form 4 butadiene block branches. However, the use of the radial block copolymer having 4 butadiene block branches as a base polymer of adhesive compositions may cause a deterioration of adhesive capacity as disclosed in U.S. Pat. No. 6,534,593 B1 it is may also deteriorate heat stability of the adhesive compositions in the case of polystyrene-polyisoprene block copolymers comprised of a polystyrene-polyisoprene block alone, heat stability may be deteriorated.

Some techniques for block copolymers having both the isoprene block and the butadiene block for improvement of heat stability are already disclosed, for example, in U.S. Pat. Nos. 5,532,319; and 5,583,182.

In summary, the polystyrene-polyisoprene block copolymer forms a 3-branched polymer instead of a 4-branched polymer by a coupling reaction with a tetravalent coupling agent due to steric hindrance of the isoprene block terminal. To solve this problem, the addition of a small amount of butadiene to the isoprene block terminal is suggested. But, the use of butadiene may deteriorate adhesive capacity, while without using butadiene results in poor heat stability. Accordingly, there is a need for a novel design of the base polymer that maintains adequate adhesive capacity and viscosity stability.

SUMMARY OF THE INVENTION

In an attempt to develop radial polystyrene-polyisoprene block copolymers having a structure having optimized heat stability and adhesion property, the inventors of the present invention found out that a 4-branched radial polystyrene-polyisoprene block copolymer with one butadiene block, i.e., a 4-branched radial SIS comprised of three polystyrene-polyisoprene blocks and one polystyrene-polyisoprene-polybutadiene block, thereby completing the present invention.

It is an object of the present invention to provide a hetero-branched polystyrene-polyisoprene radial block copolymer having high holding power, good adhesion, and high heat stability.

It is another object of the present invention to provide a method for preparing the hetero-branched polystyrene-polyisoprene radial block copolymer.

To achieve the objects of the present invention, there is provided a hetero-branched radial polystyrene-polyisoprene block copolymer represented by the following formula I:

$(pS-pI)_3X-(pB-pI-pS)$            Formula I where pS is polystyrene; pI is polyisoprene; pB is polybutadiene; and X is a residue of a tetravalent coupling agent.

To achieve the objects of the present invention, there is further provided a method for preparing a hetero-branched radial polystyrene-polyisoprene block copolymer that includes: (a) adding a styrene monomer in the presence of an organolithium initiator in an inert hydrocarbon solvent and proceeding polymerization until all of the monomer is consumed, to synthesize a polystyrene living polymer; (b) adding an isoprene monomer to the polystyrene living polymer and proceeding polymerization until all of the monomer is consumed, to synthesize a polystyrene-polyisoprene diblock living polymer; (c) adding a tetravalent coupling agent to the polystyrene-polyisoprene diblock living polymer and proceeding a primary coupling reaction; and (d) further adding a butadiene monomer, proceeding a secondary coupling reaction to produce a hetero-branched radial polystyrene-polyisoprene block copolymer represented by the above formula I while the butadiene monomer is consumed to form a butadiene block, and completing the reaction:

More specifically, in the present invention, the styrene monomer and the isoprene monomer are sequentially polymerized using an organolithium initiator in the presence of an inert hydrocarbon solvent, and a tetravalent coupling agent is then added for coupling to form a polymer branched with three polystyrene-polyisoprene blocks due to steric hindrance. An addition of the butadiene monomer to this polymer solution causes polymerization of the butadiene monomer to the living polystyrene-polyisoprene-Li to form one polystyrene-polyisoprene-polybutadiene block.

The tri-block copolymer thus formed participates in a secondary coupling reaction to one unreacted functional group of the 3-branch polymer to form a hetero-branched radial block copolymer having a structure of $(pS-pI)_3X-(pB-pI-pS)$, which includes a hetero branch, polystyrene-polyisoprene-polybutadiene block.

The present invention is directed to a radial block copolymer having a structure of $(pS-pI)_3X-(pB-pI-pS)$, and its preparation method.

Next, the polymerization step for the block copolymer of the present invention will be described in detail as follows.

In the step 1, a styrene monomer is added with an organolithium initiator in the presence of an inert hydrocarbon solvent and sufficiently polymerized until it is consumed (to synthesize polystyrene-Li living polymer).

The organolithium initiator as used in the present invention can be any organolithium compound that initiates polymerization of styrene, isoprene, and butadiene.

The specific examples of the organolithium initiator may include methyllithium, n-propyllithium, n-butyllithium, or sec-butyllithium. Preferably, the organolithium initiator includes n-butyllithium, or sec-butyllithium.

The inert hydrocarbon solvent for polymerization can be selected from known solvents for anionic polymerization. The suitable solvent may include aliphatic, cycloaliphatic or aromatic hydrocarbons, or mixtures of these hydrocarbons. The specific examples of the aliphatic hydrocarbons include butane, pentane, hexane, or heptane; those of the cycloaliphatic hydrocarbons include cyclohexane, cycloheptane, cyclopentane, methylcyclohexane, or methylcycloheptane; and those of the aromatic hydrocarbons include benzene, toluene, or xylene. Preferably, the solvent includes cyclohexane, a mixture of cyclohexane and n-hexane, or a mixture of cyclohexane and n-heptane.

The term "styrene", "polystyrene' or "pS of the formula I" as used herein does not only mean styrene specifically, but also refers to all vinyl aromatic hydrocarbon monomers. The vinyl aromatic hydrocarbon monomers available herein include alkyl-substituted styrenes, alkoxy-substituted styrenes, 2-vinyl pyridine, 4-vinyl pyridine, vinyl naphthalene, or alkyl-substituted naphthalene.

In the step 2, an isoprene monomer is added to the living polymer obtained in the step 1, polystyrene-Li polymerized until it is consumed, to synthesize a living diblock polymer (polystyrene-polyisoprene-Li).

In the step 3, a tetravalent coupling agent is added to the diblock copolymer obtained in the step 2 to produce a 3-branched polymer that includes three polystyrene-polyisoprene diblocks. The specific examples of the tetravalent coupling agent may include halogenated silicon coupling agents such as silicon tetrachloride or silicon tetrabromide; or alkoxysilanes such as tetramethoxysilane, or tetraethoxysilane. The most preferred tetravalent coupling agent is silicon tetrachloride ($SiCl_4$).

In the step 4, a butadiene monomer is added to the polymer solution of the step 3 The butadiene monomer reacts with unreacted polystyrene-polyisoprene-Li to form a triblock(polystyrene-polyisoprene-polybutadiene-Li). This polystyrene-polyisoprene-polybutadiene-Li block reacts with one unreacted functional group of the 3-branched polymer through a secondary coupling reaction to form a hetero-branched (4-branched) radial SIS represented by the formula I.

Lewis bases, which are polar compounds to increase the vinyl content of a diene polymer, are generally used in combination with a polymerization solvent so as to adequately control molecular weight distribution and polymerization rate from polymerization of the styrene monomer. The polar compounds, Lewis bases can also be used as a coupling activator to control the coupling rate in the secondary coupling step, i.e., the step 4. The Lewis bases that are a polar compound used for these purposes largely include ethers and amines. The specific examples of ethers may include diethyl ether, dibutyl ether, THF, ethylene glycol dimethyl ether, ethylene glycol dibutyl ether, dioxane, triethylene glycol ether, 1,2-dimethoxy benzene, 1,2,3-trimethoxy benzene, 1,2,4-trimethoxy benzene, 1,2,3-triethoxy benzene, or 1,2,3-tributoxy benzene. The specific examples of amines may include triethyl amine, tripropyl amine, tributyl amine, N,N,N',N'-tetramethyl ethylene diamine, N,N,N',N'-tetraethyl ethylene diamine, 1,2-dimorpholinoethane, 1,2-dipiperidinoethane, or Sparteine. These polar compounds can be used alone or in combination.

These polar compounds can be further added in the middle of the reaction as well as at the initial stage of the reaction. The adequate point of time for a second addition of the polar compounds is before or after the addition of the coupling agent, and also before or after a second addition of butadiene. By partially adding the polar compounds twice, i.e., at the initial and middle stages of the reaction, it is possible to control the 3,5-vinyl content of isoprene to a desired level while maintaining the microstructure of polymer.

Each step of the polymerization reaction can be performed both in the same temperature condition and in a different temperature condition, and both in the constant temperature condition and in the adiabatic temperature condition. The range of reaction temperature available is –10 to 150° C., preferably 10 to 100° C.

The styrene content of the hetero-branched radial SIS thus obtained in the present invention is in the range of 10 to 95 wt. %, and for the maintenance of adequate mechanical and applied properties, preferably 10 to 50 wt. %, most preferably 10 to 35 wt. %. If not specifically limited, the weight average molecular weight of the polystyrene block is in the range of about 5,000 to 40,000, and for the maintenance of adequate mechanical and applied properties, preferably about 5,000 to 40,000, most preferably about 8,000 to 20,000. The isoprene content of the isoprene block polymer is preferably 40 to 80 wt. %.

The weight average molecular weight of the hetero-branched radial SIS is 50,000 to 400,000, preferably 80,000 to 250,000.

The coupling rate after secondary coupling reaction is in the range of 10 to 100%, and for the maintenance of balanced mechanical properties, preferably 30 to 100%, most preferably 50 to 90%. In the present invention, the coupling rate is defined as the mass of coupled polymer divided by the sum of the mass of uncoupled polymer and the mass of coupled polymer, multiplied by 100. This can be expressed by the following equation 1.

$$\text{Mass of coupled polymer/Mass of (uncoupled+coupled polymer)} \times 100 \qquad \text{Equation 1}$$

The coupled rate is measured by an analysis using the gel permeation chromatography.

In the present invention, the butadiene content added after the coupling agent following the completion of the isoprene polymerization is 0.05 to 10 wt. %, preferably 0.5 to 2.0 wt. %. If the butadiene content exceeds 10 wt. %, then a deterioration of adhesive capacity and gelation may occur in using the base of the adhesive. The weight average molecular weight of the polybutadiene block thus obtained is preferably in the range of about 50 to 40,000.

As the secondary coupling reaction proceeds to a proper degree, a reaction terminator is added to complete the reaction. The specific examples of the reaction terminator may include water, alcohol, polyol, ethoxys, ketones, aldehydes, carbon dioxide, or acids. The role of the reaction terminator is deactivating the terminal of the living polymer. After the deactivation of the living polymer, a proton donating acid compound, such as phosphate, sulfate, hydrochloric acid, boric acid, or $C_3$–$C_{20}$ monocarboxylic acid or polycarboxylic acid is added to adjust the pH of the polymer. Finally, an antioxidant is added and a desired dry polymer is obtained after steam stripping and drying steps.

The hetero-branched polymer thus obtained in the present invention is characterized by enhanced heat stability in the high-temperature processing condition due to the effect of the butadiene block, relative to a radial polystyrene-polyisoprene block without the butadiene block. Namely, it exhibits more excellent heat resistance because of one polystyrene-polyisoprene-polybutadiene triblock branch than the radial SIS comprising only a polystyrene-polyisoprene block. Additionally, the hetero-branched polymer has much improved harmonized properties in regard to adhesion property relative to the radial SIS having a polystyrene-polyisoprene-polybutadiene block.

DETAILED DESCRIPTION OF THE INVENTION

Hereinafter, the present invention will be described in detail by way of the following examples, which are not intended to limit the scope of the present invention.

EXAMPLE 1

960 g of cyclohexane, 6.6 mmol of THF and 32 g of styrene were mixed in a 2 L reactor in the nitrogen atmosphere and then 2.7 mmol of n-butyllithium was added at 60° C. to initiate the reaction. After 10 minutes from the maximum temperature achieved by the exothermic reaction, 126.4 g of isoprene was added to cause a polymerization reaction. After 3 minutes from the maximum level of the isoprene polymerization temperature, 0.55 mmol of silicon tetrachloride ($SiCl_4$) was successively added to cause a coupling reaction for 5 minutes. 1.5 g of butadiene was further added to the coupled polymer solution and observed for 20 minutes or more. Every about 5 minutes, a sample of the reactant solution was completely deactivated and subjected to GPC(Gel Permeation Chromatography). The results are presented in Tables 1 and 2.

EXAMPLE 2

960 g of cyclohexane, 1.3 mmol of THF and 32 g of styrene were mixed in a 2 L reactor in the nitrogen atmosphere and then 2.7 mmol of n-butyllithium was added at 60° C. to initiate the reaction. After 10 minutes from the maximum temperature achieved by the exothermic reaction, 126.4 g of isoprene was added to cause a polymerization reaction. After 3 minutes from the maximum level of the isoprene polymerization temperature, 0.55 mmol of silicon tetrachloride ($SiCl_4$) was successively added to cause a coupling reaction for 5 minutes. 1.5 g of butadiene and 5.0 mmol of THF were further added to the coupled polymer solution and observed for 20 minutes or more. Subsequently, the reactant solution was completely deactivated and subjected to GPC. The results are presented in Table 2.

EXAMPLE 3

960 g of cyclohexane, 1.3 mmol of THF and 32 g of styrene were mixed in a 2 L reactor in the nitrogen atmosphere and then 2.7 mmol of n-butyllithium was added at 60° C. to initiate the reaction. After 10 minutes from the maximum temperature achieved by the exothermic reaction, 126.4 g of isoprene was added to cause a polymerization reaction. After 3 minutes from the maximum level of the isoprene polymerization temperature, 0.55 mmol of silicon tetrachloride ($SiCl_4$) was successively added to cause a coupling reaction for 5 minutes. 1.5 g of butadiene and 0.82 mmol of N,N,N',N'-tetramethyl ethylene diamine(TMEDA) were further added to the coupled polymer solution and observed for 20 minutes or more. Subsequently, the reactant solution was completely deactivated and subjected to GPC. The results are presented in Table 2.

EXAMPLE 4

960 g of cyclohexane, 1.3 mmol of THF and 32 g of styrene were mixed in a 2 L reactor in the nitrogen atmosphere and then 2.7 mmol of n-butyllithium was added at 60° C. to initiate the reaction. After 10 minutes from the maximum temperature achieved by the exothermic reaction, 126.4 g of isoprene was added to cause a polymerization reaction. After 3 minutes from the maximum level of the isoprene polymerization temperature, 0.55 mmol of silicon tetrachloride ($SiCl_4$) was successively added to cause a coupling reaction for 5 minutes. 1.5 g of butadiene and 1.5 mmol of diethylene glycol dimethyl ether were further added to the coupled polymer solution and observed for 20 minutes or more. Subsequently, the reactant solution was completely deactivated and subjected to GPC. The results are presented in Table 2.

TABLE 1

| Elapsed time (min.) after addition of butadiene | Block copolymer content (%) | | | Coupling rate (%) |
| --- | --- | --- | --- | --- |
| | 4-branch | 3-branch | 2-branch | |
| 0 | 3.0 | 87 | 10 | 58 |
| 5 | 58 | 42 | 0 | 65 |
| 10 | 76 | 24 | 0 | 65 |
| 15 | 100 | 0 | 0 | 70 |
| 20 | 100 | 0 | 0 | 70 |

The results of Table 1 reveal that a 3-branched polymer with three polystyrene-polyisoprene blocks was mainly formed before the addition of butadiene. Upon adding the butadiene to this polymer solution, the butadiene block was added to the unreacted polystyrene-polyisophrene diblock and a secondary coupling reaction occurred with one unreacted functional group in the center of the 3-branched polymer to form a 4-branched polymer composition having a structure of $(pS-pI)_3X-(pB-pI-pS)$ (where X=Si). After the addition of butadiene, 4-branched and 3-branched polymers coexisted initially and, after about 15 minutes, only the 4-branched polymer was formed and this state was continued after then.

TABLE 2

| | Examples | | | |
| --- | --- | --- | --- | --- |
| | 1 | 2 | 3 | 4 |
| Styrene (wt. %) | 20 | 20 | 20 | 20 |
| Isoprene (wt. %) | 79 | 79 | 79 | 79 |
| Butadiene (wt. %) | 1.0 | 1.0 | 1.0 | 1.0 |
| Polar compound (initial/middle stage of reaction) | THF/— | THF/THF | THF/TMEDA[1] | THF/digyme[2] |
| Coupling rate (%) | 72 | 72 | 72 | 72 |
| isoprene 3,4-vinyl content (%) | 14 | 8.2 | 8.2 | 8.2 |
| weight average molecular weight(Mw) of polystyrene block | 21200 | 21600 | 20900 | 21000 |
| Mw of polybutadiene block | 1200 | 1100 | 1300 | 1300 |

TABLE 2-continued

| | Examples | | | |
|---|---|---|---|---|
| | 1 | 2 | 3 | 4 |
| Mw of whole block copolymer | 17500 | 182000 | 178000 | 180000 |

(Note)
[1]TMEDA: N,N,N',N'-tetramethyl ethylene diamine
[2]digyme: diethylene glycol dimethyl ether According to the results of Table 2, THF, the polar compound for accelerating the coupling rate in the secondary coupling step was all added at the initial stage of reaction in Example 1. As a result, the 3,4-vinyl content in the isoprene increased to 14%, as demonstrated by $^1$H NMR. Contrarily, THF was added at the initial stage of reaction and further used in combination with N,N,N',N'-tetramethyl ethylene diamine(TMEDA) and diethylene glycol dimethyl ether(digyme) at the middle stage of reaction in Examples 2, 3 and 4. In this case, the vinyl content in the isoprene lowered to 8.2% while the microstructure of the polymer as well as the coupling rate was maintained. Furthermore, the 4-branch polymer was synthesized successfully In this manner, polar compounds of the same kind or different kinds can be added separately in the initial and middle stages of reaction so as to control the vinyl content of the resultant polymer.

EXAMPLE 5

960 g of cyclohexane, 1.3 mmol of THF and 32 g of styrene were mixed in a 2 L reactor in the nitrogen atmosphere and then 2.7 mmol of n-butyllithium was added at 60° C. to initiate the reaction. After 10 minutes from the maximum temperature achieved by the exothermic reaction, 124.8 g of isoprene was added to cause a polymerization reaction. After 3 minutes from the maximum level of the isoprene polymerization temperature, 0.55 mmol of silicon tetrachloride (SiCl$_4$) was successively added to cause a coupling reaction for 5 minutes. 1.5 g of butadiene and 5.3 mmol of THF were further added to the coupled polymer solution and, after 10 minutes, a polymer terminator was added to the living polymer solution. The living polymer solution was then completely deactivated by stirring and mixed with an antioxidant to form the final product. The block copolymer thus obtained was analyzed by GPC in regard to its molecular weight and coupling rate before and after the coupling reaction. The results are presented in Table 3.

EXAMPLE 6

960 g of cyclohexane, 1.3 mmol of THF and 32 g of styrene were mixed in a 2 L reactor in the nitrogen atmosphere and then 2.7 mmol of n-butyllithium was added at 60° C. to initiate the reaction. After 10 minutes from the maximum temperature achieved by the exothermic reaction, 123.2 g of isoprene was added to cause a polymerization reaction. After 3 minutes from the maximum level of the isoprene polymerization temperature, 0.55 mmol of silicon tetrachloride(SiCl$_4$) was successively added to cause a coupling reaction. 4.8 g of butadiene and 5.3 mmol of THF were further added to the coupled polymer solution and, after 10 minutes, a polymer terminator was added to the living polymer solution. The living polymer solution was then completely deactivated by stirring and mixed with an antioxidant to form the final product. The block copolymer thus obtained was analyzed by GPC in regard to its molecular weight and coupling rate before and after the coupling reaction. The results are presented in Table 3.

EXAMPLE 7

960 g of cyclohexane, 1.3 mmol of THF and 35 g of styrene were mixed in a 2 L reactor in the nitrogen atmosphere and then 2.7 mmol of n-butyllithium was added to initiate the reaction. After 10 minutes from the maximum temperature achieved by the exothermic reaction, 124.8 g of isoprene was added to cause a polymerization reaction. After 3 minutes from the maximum level of the isoprene polymerization temperature, 0.55 mmol of silicon tetrachloride (SiCl$_4$) was successively added to cause a coupling reaction. 7.3 g of butadiene and 5.3 mmol of THF were further added to the coupled polymer solution and, after 10 minutes, a polymer terminator was added to the living polymer solution. The living polymer solution was then completely deactivated by stirring and mixed with an antioxidant to form the final product. The block copolymer thus obtained was analyzed by GPC in regard to its molecular weight and coupling rate before and after the coupling reaction. The results are presented in Table 3.

COMPARATIVE EXAMPLE 1

960 g of cyclohexane, 0.82 mmol of tetramethyl ethylene diamine and 32 g of styrene were mixed in a 2 L reactor in the nitrogen atmosphere and then 2.7 mmol of n-butyllithium was added at 60° C. to initiate the reaction. After 10 minutes from the maximum temperature achieved by the exothermic reaction, 128 g of isoprene was added to cause a polymerization reaction. After 3 minutes from the maximum level of the isoprene polymerization temperature, 0.55 mmol of silicon tetrachloride(SiCl$_4$) were successively added to cause a coupling reaction. A polymer terminator was then added to the resultant living polymer solution. The living polymer solution was completely deactivated by stirring and mixed with an antioxidant to form the final product. The block copolymer thus obtained was analyzed by GPC in regard to its molecular weight and coupling rate before and after the coupling reaction. The results are presented in Table 3.

COMPARATIVE EXAMPLE 2

960 g of cyclohexane, 1.3 mmol of THF and 32 g of styrene were mixed in a 2 L reactor in the nitrogen atmosphere and then 2.7 mmol of n-butyllithium was added at 60° C. to initiate the reaction. After 10 minutes from the maximum temperature achieved by the exothermic reaction, 124.8 g of isoprene was added to cause a polymerization reaction. After 3 minutes from the maximum level of the isoprene polymerization temperature, 5.2 g of butadiene was added to perform a polymerization reaction, and 0.55 mmol of silicon tetrachloride(SiCl$_4$) were added to cause a coupling reaction. A polymer terminator was then added to the resultant living polymer solution. The living polymer solution was then completely deactivated by stirring and mixed with an antioxidant to form the final product. The block copolymer thus obtained was analyzed by GPC in regard to its molecular weight and coupling rate before and after the coupling reaction. The results are presented in Table 3.

TABLE 3

|  | Example | | | Comparative Example | |
|---|---|---|---|---|---|
|  | 5 | 6 | 7 | 1 | 2 |
| Styrene (wt. %) | 20 | 20 | 21 | 20 | 19.8 |
| Isoprene (wt. %) | 79.0 | 77.0 | 75.0 | 80 | 77 |
| Butadiene (wt. %) | 1.0 | 3.0 | 4.0 | 0 | 3.2 |
| Catalyst (mmol) | 2.7 | 2.7 | 2.7 | 2.7 | 2.7 |
| Coupling agent (mmol) | 0.55 | 0.55 | 0.55 | 0.55 | 0.55 |
| Molecular weight (Mp) after coupling | 174,000 | 175,000 | 171,000 | 189,000 | 175,000 |
| Molecular weight (Mp) before coupling | 55,000 | 57,000 | 57,000 | 59,000 | 56,000 |
| Coupling rate (%) | 71 | 72 | 75 | 75 | 73 |
| Isoprene 3,4-vinyl content (%) | 8.2 | 8.2 | 8.2 | 9.1 | 8.3 |
| Mw of polystyrene | 19,500 | 19,000 | 20,200 | 21,000 | 19,800 |
| Mw of polybutadiene | 800 | 2,400 | 4,500 | — | 2,200 |

EXPERIMENTAL EXAMPLE

To analyze the block copolymers obtained in Examples 5, 6 and 7, and Comparative Examples 1 and 2 in regard to heat stability and pressure-sensitive adhesion property, block copolymer samples were prepared according to the pressure-sensitive adhesive composition of Table 4. For sufficient blending of the pressure-sensitive adhesion composition, the ingredients were stirred in a laboratory scale batch mixer at 150 to 165° C. for 2.5 hours in the nitrogen atmosphere.

The hot melt mixer was coated on a 20 to 25 μm thickness PET film.

TABLE 4

| | |
|---|---|
| SIS polymer | 100 parts by weight |
| Tackifier resin (Wingtack 86 supplied by Coodyear tire & Rubber) | 100 parts by weight |
| Oil (WT2150 supplied by Michang petroleum) | 10 parts by weight |
| Antioxidant (Irganox 1010 supplied by Ciba-Geigy) | 2 parts by weight |

Subsequently, tests for heat stability and pressure-sensitive adhesion property were carried out according to the procedures described below.

(1) Retention of Viscosity at High Temperature (Heat Stability Test)

The melt viscosity of each pressure-sensitive adhesive composition sample was measured by means of using a Brookfield Thermosel Viscometer at 180° C. This pressure-sensitive adhesive composition sample was then heated at 180° C. for 24 hours, and its melt viscosity was measured again, thereby determining a ratio of the melt viscosity after the heating to the melt viscosity before the heating (unit: %). This ratio indicates a retention of the melt viscosity after the heat treatment. Heat stability is better as this value is greater.

(2) Color Change Test at High Temperature

Color change of the samples was checked with the heat stability test simultaneously. After pressure-sensitive adhesive composition was heated at 180° C. for 24 hours, the color was also checked.

(3) Loop Tack Testing

About 20 to 25 μm adhesive film was coated onto a polyester film. The film was allowed to dry for a minimum of 24 hours. The film was then mated with release liner, and cut into 1×5 inch strips. A test sample was then inserted into a Chemsultants International Loop Tack Tester with the adhesive side facing out.

(4) Holding Power

The cohesive strength of the adhesives was determined according to the general procedures outlined in PSTC-7 (a holding power test prescribed by the American Pressure Sensitive Tape Council). Specifically, a piece of pressure-sensitive adhesive tap having a width of 12.5 mm was adhered to paper so as to give a 12.5×12.5 mm bonded area, and its holding power was measured at 49° C.

(5) 180° Peel Adhesion

Adhesive capacity on steel by peeling at 180° was measured in g/2.5 cm and determined according to regulation PSTC 1.

The results are presented in Table 5.

TABLE 5

| | | Examples | | | Comparative examples | |
|---|---|---|---|---|---|---|
| | | 5 | 6 | 7 | 1 | 2 |
| Heat stability | Viscosity maintenance rate at high temperature (%) | 22 | 25 | 24 | 14 | 17 |
| | Color change at high temperature | Pale brown | Pale brown | Pale brown | Pale brown | Pale brown |
| pressure-sensitive adhesive properties | Loof tack (gf/in) | 2,278 | 2,324 | 2,290 | 2,250 | 2,270 |
| | Holding powere (min.) | >3,000 | >3,000 | >3,000 | >3,000 | >3,000 |
| | 180° peel (gf/in) | 1,490 | 1,510 | 1,470 | 1,170 | 1,350 |

As can be seen from the results of Table 5, the radial block copolymer having butadiene blocks to all the four branches in Comparative Example 2 and the radial block copolymer having isoprene blocks to all the four branches in Comparative Example 1 were poor in the retention of viscosity at high temperature relative to the radial block copolymers of Examples 5, 6 and 7. But, after 72 hours at a high temperature of 180° C., the radial block copolymers had little difference in color tone.

In regard to the pressure-sensitive adhesion property, the radial block copolymers of Examples 5, 6 and 7 showed enhanced adhesion performance relative to those of Comparative Examples 1 and 2.

Accordingly, the polymers synthesized according to the present invention were particularly excellent in heat stability and showed an adhesion property equivalent to or greater than the existing products.

As described above in detail, the 4-branched radial SIS comprised of three polystyrene-polyisoprene blocks and one polystyrene-polyisoprene-polybutadiene block according to the present invention is excellent in heat stability and adhesion property and therefore useful as a base polymer of pressure-sensitive adhesives.

What is claimed is:

1. A hetero-branched radial polystyrene-polyisoprene block copolymer represented by (pS-pI)₃X-(pB-pI-pS)

wherein pS is polystyrene; pI is polyisoprene; pB is polybutadiene; and X is a residue of a tetravalent coupling agent.

2. The hetero-branched radial polystyrene-polyisoprene block copolymer as claimed in claim 1, wherein a block represented by pS has a weight average molecular weight of 5,000 to 40,000; a block represented by pB has a weight average molecular weight of 50 to 40,000; and the block copolymer has a weight average molecular weight of 50,000 to 400,000.

3. The hetero-branched radial polystyrene-polyisoprene block copolymer as claimed in claim 1, wherein X is Si.

4. The hetero-branched radial polystyrene-polyisoprene block copolymer as claimed in claim 2, wherein X is Si.

5. A method for preparing a hetero-branched radial polystyrene-polyisoprene block copolymer, comprising:
   (a) adding a styrene monomer in the presence of an organolithium initiator in an inert hydrocarbon solvent and proceeding polymerization until all of the styrene monomer is consumed, to synthesize a polystyrene living polymer;
   (b) adding an isoprene monomer to the polystyrene living polymer and proceeding polymerization until all of the isoprene monomer is consumed, to synthesize a living polystyrene-polyisoprene diblock polymer;
   (c) adding a tetravalent coupling agent to the living polystyrene-polyisoprene diblock polymer and proceeding a primary coupling reaction; and
   (d) further adding a butadiene monomer, proceeding a secondary coupling reaction to produce a hetero-branched radial polystyrene-polyisoprene block copolymer represented by the following formula I while the butadiene monomer is consumed to form a butadiene block, and completing the reaction:

(pS-pI)₃X-(pB-pI-pS)

wherein pS is polystyrene; pI is polyisoprene; pB is polybutadiene; and X is a residue of the tetravalent coupling agent.

6. The method as claimed in claim 5, wherein the inert hydrocarbon solvent includes cyclohexane, a mixture of cyclohexane and n-hexane, or a mixture of cyclohexane and n-heptane.

7. The method as claimed in claim 5, wherein the organolithium initiator includes n-butyllithium, or sec-butyllithium.

8. The method as claimed in claim 5, wherein the tetravalent coupling agent includes at least one selected from halogenated silicon coupling agents such as silicon tetrachloride, or silicon tetrabromide; or alkoxysilanes such as tetramethoxysilane, or tetraethoxysilane.

9. The method as claimed in claim 5, wherein the butadiene monomer is added in an amount of 0.05 to 10 wt. %.

10. The method as claimed in claim 5, wherein the styrene monomer is added in an amount of 10 to 50 wt. %.

11. The method as claimed in claim 5, wherein a block represented by pS has a weight average molecular weight of 5,000 to 40,000.

12. The method as claimed in claim 5, wherein the block copolymer has a weight average molecular weight of 50,000 to 400,000.

13. The method as claimed in claim 5, wherein the coupling rate after secondary coupling reaction is in the range of 30 to 100%.

14. The method as claimed in claim 5, further comprising:
   adding a polar compound so as to control the rates of the polymerization and coupling reactions.

15. The method as claimed in claim 14, wherein the polar compound includes diethyl ether, dibutyl ether, THF, ethylene glycol dimethyl ether, ethylene glycol dibutyl ether, dioxane, triethylene glycol ether, 1,2-dimethoxy benzene, 1,2,3-trimethoxy benzene, 1,2,4-trimethoxy benzene, 1,2,3-triethoxy benzene, 1,2,3-tributoxy benzene, triethyl amine, tri propyl amine, tributyl amine, N,N,N',N'-tetramethyl ethylene diamine, N,N,N',N'-tetraethyl ethylene diamine, 1,2-dimorpholinoethane, 1,2-dipiperidinoethane, and Sparteine, which are used alone or in combination.

16. The method as claimed in claim 14, wherein the addition of the polar compound is performed in batch mixing at the initial step of reaction, or separately at the initial and a butadiene monomer addition step of reaction.

17. The method as claimed in claim 15, wherein the addition of the polar compound is performed in batch mixing at the initial step of reaction, or separately at the initial and a butadiene monomer addition step of reaction.

* * * * *